United States Patent
Stoops

(10) Patent No.: US 8,186,280 B2
(45) Date of Patent: *May 29, 2012

(54) LOAD BEARING ROBOTIC TURNTABLE

(76) Inventor: Dean Stoops, Corona, CA (US)

( * ) Notice: Subject to any disclaimer, the term of this patent is extended or adjusted under 35 U.S.C. 154(b) by 449 days.

This patent is subject to a terminal disclaimer.

(21) Appl. No.: 12/356,073

(22) Filed: Jan. 19, 2009

(65) Prior Publication Data

US 2009/0120330 A1 May 14, 2009

Related U.S. Application Data

(63) Continuation-in-part of application No. 11/059,751, filed on Feb. 16, 2005, now Pat. No. 7,478,601.

(51) Int. Cl.
*A47F 5/12* (2006.01)

(52) U.S. Cl. .............................. 108/7; 108/20

(58) Field of Classification Search ........ 108/20, 108/7, 1, 94, 21, 22; 74/16, 825
See application file for complete search history.

(56) References Cited

U.S. PATENT DOCUMENTS

| | | | |
|---|---|---|---|
| 4,365,561 A | 12/1982 | Tellier et al. | |
| 4,815,391 A | 3/1989 | Lee | |
| 4,873,651 A | 10/1989 | Raviv | |
| 5,023,895 A | 6/1991 | McCroskey et al. | |
| 5,036,776 A | 8/1991 | Veyhl et al. | |
| 5,054,991 A | 10/1991 | Kato | |
| 5,117,761 A | 6/1992 | Kasai et al. | |
| 5,340,111 A | 8/1994 | Froelich | |
| 5,501,119 A | 3/1996 | Yanagisawa | |
| 5,518,245 A * | 5/1996 | Nelson | 108/7 |
| 5,672,291 A * | 9/1997 | Han | 219/753 |
| 6,107,615 A | 8/2000 | Choi | |
| 6,455,835 B1 | 9/2002 | Bernardini et al. | |
| 7,478,601 B2 * | 1/2009 | Stoops | 108/7 |
| 7,758,444 B2 * | 7/2010 | Crossley | 473/279 |

* cited by examiner

*Primary Examiner* — Jose V Chen
(74) *Attorney, Agent, or Firm* — Kenneth L. Green

(57) ABSTRACT

A load bearing robotic turntable includes a first rotating sine table, a second rotating sine table, and a rotating and tilting workpiece table. A motor rotates the first rotating sine table. The second rotating sine table is rotatable with respect to the first rotating sine table to change a tilt of a top surface of the second rotating sine table. The workpiece table is rotatable with respect to the second rotating table to present different faces of a workpiece mounted to the workpiece table. A first actuator cooperates with the second sine table to change the tilt of the top surface of the second sine table with respect to the horizontal. A second actuator cooperates with the workpiece table to rotate the workpiece about a tilted axis. Rotation and changes to the tilt are obtained solely by positions of the actuators and rotation of the first sine table by the motor.

6 Claims, 12 Drawing Sheets

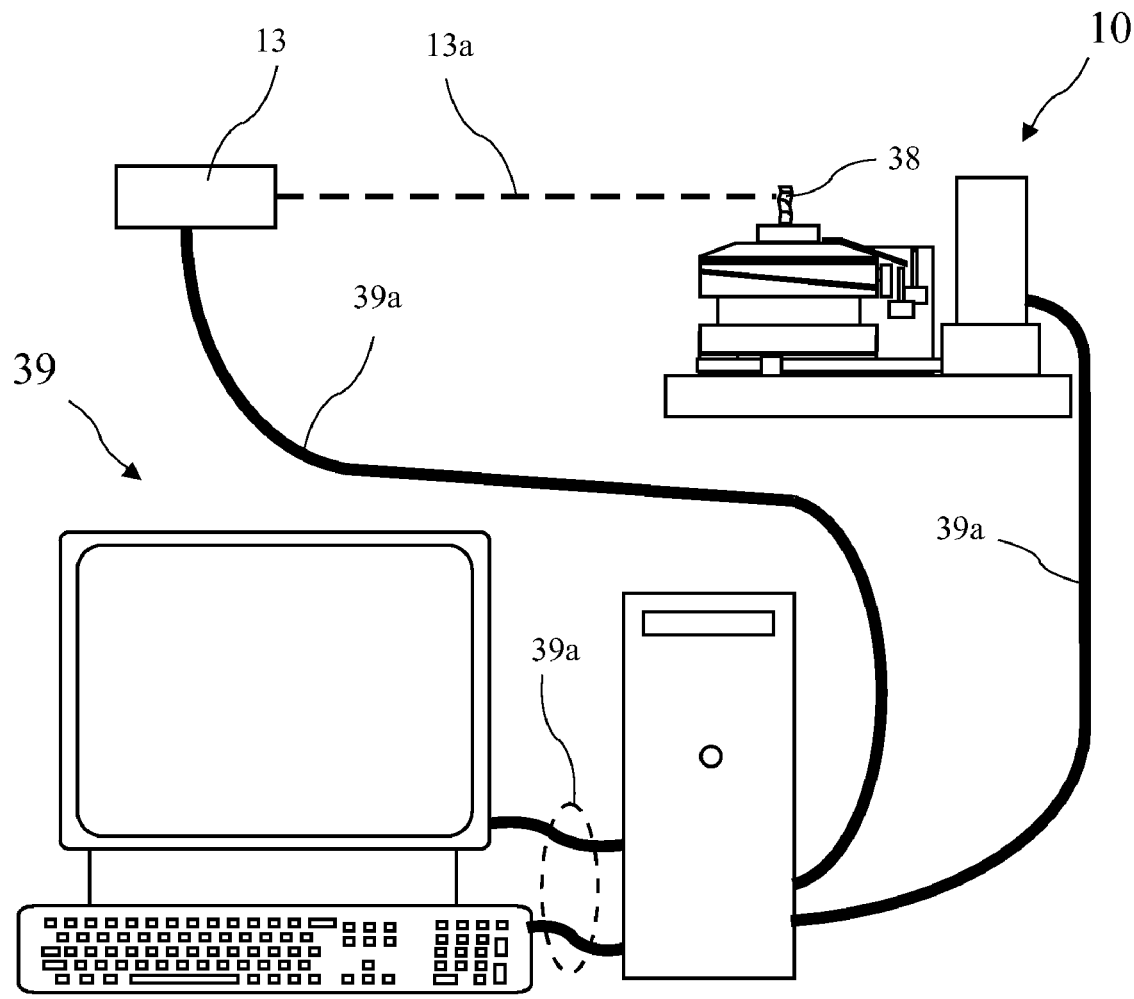
FIG. 1C
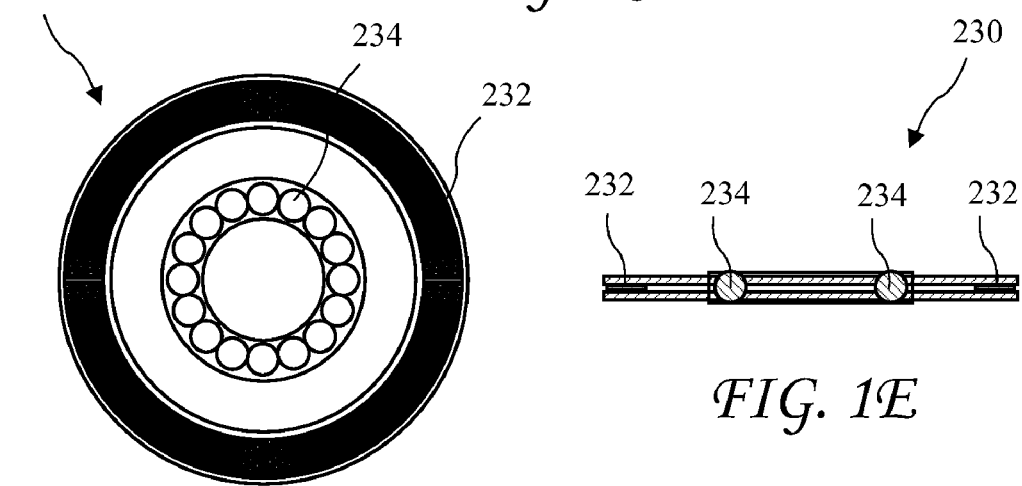
FIG. 1D
FIG. 1E

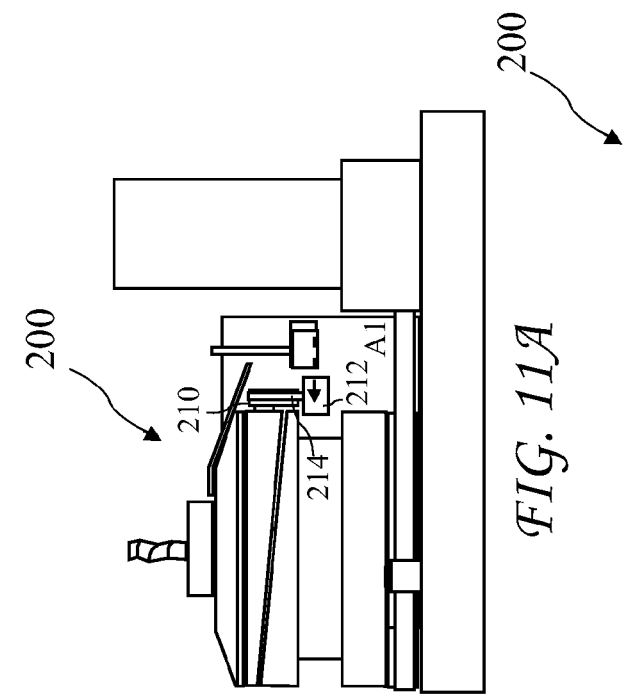
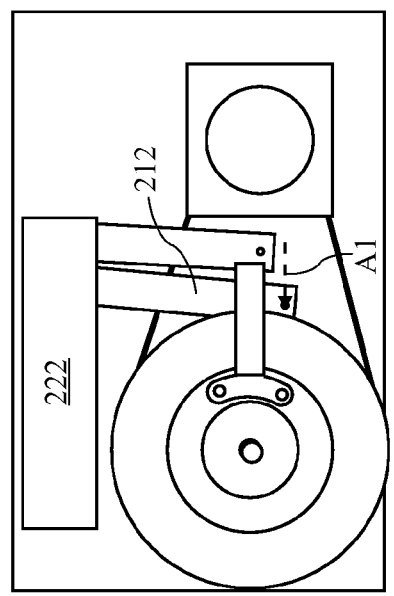
FIG. 11A
FIG. 11B
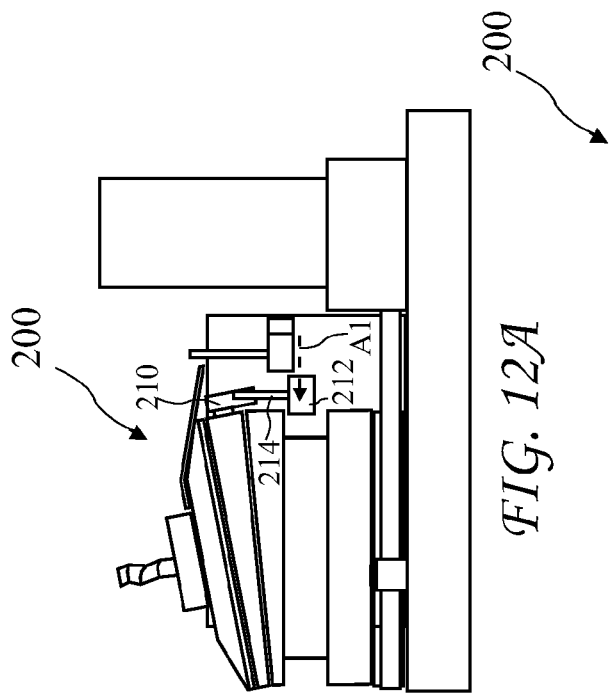
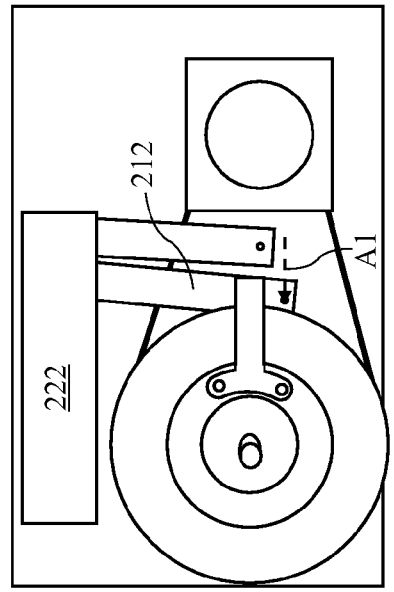
FIG. 12A
FIG. 12B

LOAD BEARING ROBOTIC TURNTABLE

The present application is a Continuation In Part (CIP) of U.S. application Ser. No. 11/059,751, filed Feb. 16, 2005, which application is incorporated herein by reference.

BACKGROUND OF THE INVENTION

The present invention relates to turntables and in particular to a robotic turntable for presenting various aspects of an object for scanning.

Various small objects are used as models for molding shaped articles. For example, ear canal moldings are made to manufacture in-the-ear hearing aids, and tooth molds are made for manufacturing crowns. Modern equipment enables scanning of moldings to generate numerical models of the shapes of moldings, and the numerical models may be used to control equipment which manufactures the final product. Known equipment for scanning moldings is expensive, and the costs are prohibitive for placement of scanning machines at dental or medical offices. As a result, moldings are mailed, resulting in mailing costs and delays in providing a product.

U.S. application Ser. No. 11/059,751, filed Feb. 16, 2005, discloses a robotic turntable which addresses the functional needs described above, but is not designed to bear heavy loads. A need thus remains for a load bearing robotic turntable. The '751 application is incorporated herein by reference.

BRIEF SUMMARY OF THE INVENTION

The present invention addresses the above and other needs by providing a load bearing robotic turntable which includes a first rotating sine table, a second rotating sine table, and a rotating and tilting workpiece table. A motor rotates the first rotating sine table. The second rotating sine table is rotatable with respect to the first rotating sine table to change a tilt of a top surface of the second rotating sine table. The workpiece table is rotatable with respect to the second rotating table to present different faces of a workpiece mounted to the workpiece table. A first actuator cooperates with the second sine table to change the tilt of the top surface of the second sine table with respect to the horizontal. A second actuator cooperates with the workpiece table to rotate the workpiece about a tilted axis. Rotation and changes to the tilt are obtained solely by positions of the actuators and rotation of the first sine table by the motor.

In accordance with one aspect of the invention, there is provided a robotic turntable comprising a motor, a first sine table rotationally driven by the motor, a second sine table rotationally coupled to the first sine table, and a workpiece table rotationally coupled to the second sine table. The second sine table and the workpiece table are tiltable with respect to the first sine table. A first actuator has a free position and a stop position. In the free position, the second sine table and the workpiece table rotate with the first sine table, and in the stop position, a rotation of the first sine table is coupled to a change in the rotational position of the second sine table and the workpiece table with respect to the first sine table. A second actuator has a second free position and a second stop position. In the second stop position, the rotation of the first sine table is coupled to a change in tilt of the second sine table and the workpiece table.

In accordance with another aspect of the invention, there is provided a method for controlling a workpiece table. The method includes aligning a workpiece table supporting a workpiece with a first sine table and rotating the first sine table to scan a workpiece. After scanning the vertically aligned workpiece, the rotation of the first sine table is stopped and a first actuator arm is aligned with a first lever attached to a second sine table. The first sine table is rotated while the first lever prevents the second sine table from rotating, thereby causing the second sine table to tilt and thereby the workpiece table to tilt. After moving the second actuator arm out of alignment with the spindle lever, the first sine table is again rotated thereby rotating the tilted workpiece table to obtain a scan of the tilted workpiece. The method may further include stopping the rotation of the first sine table and aligning a second actuator arm with a second lever attached to the workpiece table. The first sine table is then rotated while the second actuator arm blocks the second lever to create a new rotational relationship between the first sine table and the tilted workpiece table, wherein a new face of the workpiece is caused to tilt downward. The second actuator arm is moved out of alignment with the second lever and the first sine table is again rotated thereby rotating the tilted workpiece table with a different view of the workpiece.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1C is a system including a sensor and a Personal Computer (PC) cooperating with the robotic turntable.

FIG. 1D is a side view of a bearing assembly according to the present invention.

FIG. 1E is a side view of the bearing assembly according to the present invention.

FIG. 11A is a side view of the robotic turntable with a first actuator arm aligned with a first lever to rotate the first sine table while holding the second sine table and the workpiece table to change the tilt of the second sine table and the workpiece table with respect to the first sine table.

FIG. 11B is a top view of the robotic turntable with the first actuator arm aligned with the first lever to rotate the first sine table while holding the second sine table and the workpiece table to change the tilt of the second sine table and the workpiece table with respect to the first sine table.

FIG. 12A is a side view of the robotic turntable after tilting the second sine table and the workpiece table with respect to the first sine table.

FIG. 12B is a top view of the robotic turntable after tilting the second sine table and the workpiece table with respect to the first sine table.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1A:
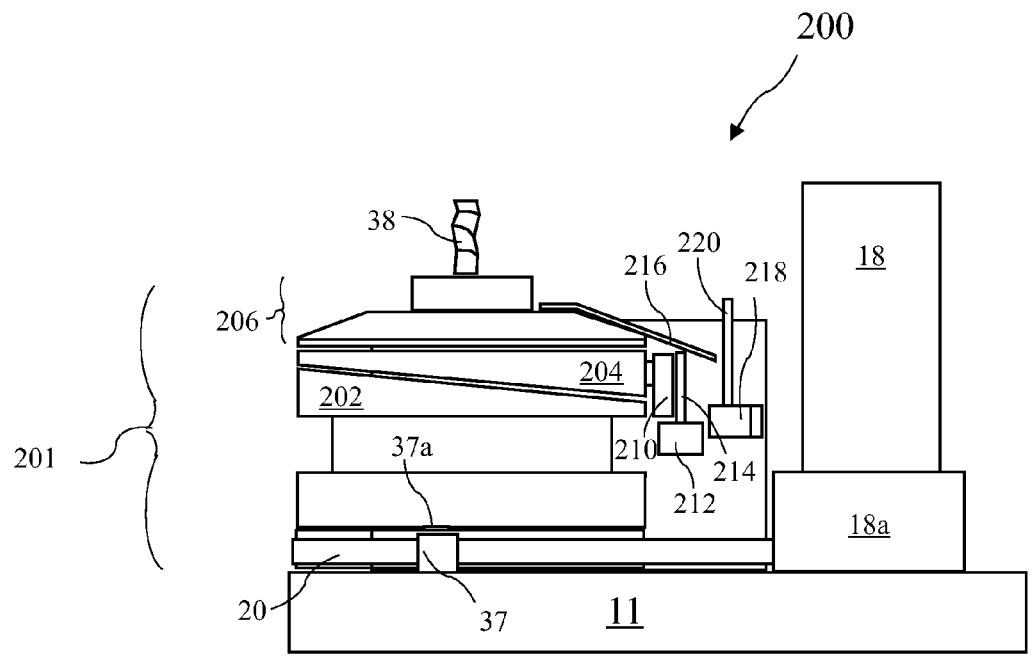
FIG. 1A is a side view of a robotic turntable according to the present invention.
Figure 1B:
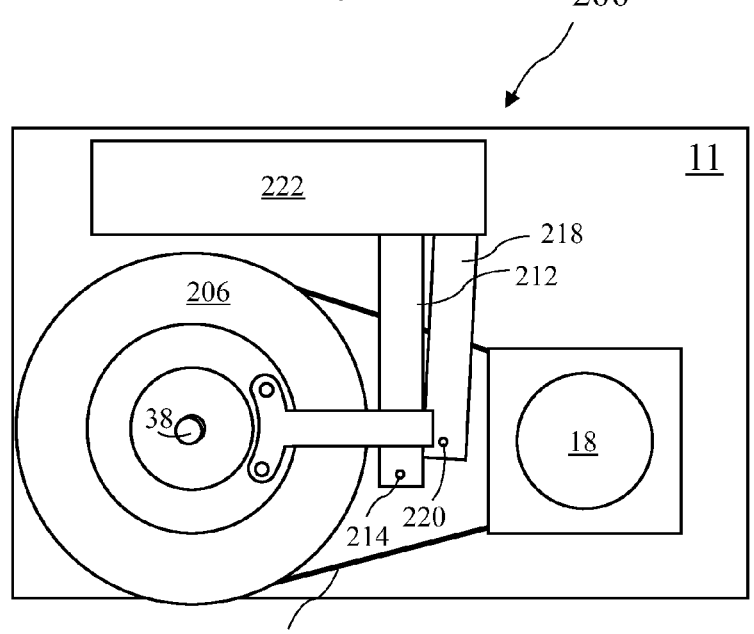
FIG. 1B is a top view of the robotic turntable according to the present invention.

A side view of a robotic turntable 200 according to the present invention is shown in FIG. 1A, and a top view of the robotic turntable 200 is shown in FIG. 1B. The turntable 200 includes a base 11 with a motor 18, actuator arms 212 and 218, and a rotating table assembly 201. The motor 18 is preferably controllable in a way that permits programmable and precise motion, and is controllable in speed, direction of rotation, and shaft angular position, and is more preferably a stepping motor, an AC servo motor, or a DC servo motor, and is most preferably a DC Servo motor with an incremental encoder attached to the motor back shaft. Alternatively, with proper feedback, an air motor, hydraulic motor and the like may be used.

The motor 18 is supported by a motor support 18a. A belt 20 connects the motor 18 to the rotating table assembly 201. The belt 20 may be a timing belt, gear drive, chain drive or similar reliable method of transmitting the exact motion of the motor shaft to the rotating table assembly 201, and is preferably a toothed belt to help maintain the timing between the motor 18 and the rotating table assembly 201.

The actuator arms 212, 218 may be solenoid actuators, air driven actuators, or hydraulic actuators, and are preferable solenoid actuators, and more preferably 12 volt solenoid actuators. The first actuator 212 includes a vertical first actuator finger 214 and the second actuator 218 includes a second vertical actuator finger 220. The motor 18, the first actuator 212, and the second actuator 218 are preferably jointly computer controlled to coordinate the rotation of the rotating table assembly 201 with the actuation of the first actuator 212 and the second actuator 218 to obtain the desired behavior as described below. A home position detector comprising elements 37 and 37a initialized the position of the turn table assembly at start-up. The home position detector is preferably a hall effect device, an optical switch, or micro switch, and is more preferably a hall effects sensor 37 and magnet 37a which allow an initial motor/table timing to be established.

A top view of a bearing assembly 230 according to the present invention is shown in FIG. 1D and a cross-sectional side view of the bearing assembly 230 is shown in FIG. 1E. The rotating table assembly 201 includes a first sine table 202, a second sine table 204, and a workpiece table 206. Each table is preferably connected by the bearing assembly 230 comprising flat needle bearings 232 outside ball bears 234. The flat need bear 232 are both economical and capable of bearing substantial axial (or vertical in this instance) loads. The ball bears 234 are capable of bearing large radial loads. The combination of the needle bear 232 and the ball bears 234 provide a robust rotating table assembly 201. While the combination of the needle bearing and the roller bearing is preferred, a rotating table assembly according to the present invention with any type bearing is intended to come within the scope of the present invention. For example, a plain bronze bearing, or even lubricated surfaces may be adequate for many applications.

The second sine table 204 includes a first lever 216 for cooperation with the first actuator arm 218, and the first sine table 12 includes a spindle lever 32 for cooperation with the second actuator arm 30. The actuators 22 and 28 raise the respective arms 24 and 30 to obtain the cooperation of the arms 24 and 30 with the notch 26 and lever 32.

The robotic turntable 200 may be programably controlled using a robotic controller comprising an electrical (e.g., a computer), or a mechanical controller (e.g., using cams, levers, hydraulics and/or pneumatics,) is preferably controlled using a computer, and is more preferably controlled using a Personal Computer (PC). A sensor 13 and a PC 39 are shown in FIG. 1C cooperating with the robotic turntable 10. The sensor 13 directs a sensor beam 13a onto the workpiece 38 to generate a digital representation of the workpiece 38. The PC 39 is connected by cables 39a to the sensor 13 and the robotic turntable 200. The sensor 13 may be, for example, a laser sensor.

The PC 39 includes a micro-processor, memory, other elements of known personal computers, and a controller (although the controller may also reside outside the PC 39). The PC 39 programs the controller to control the robotic turntable 200. A controller program may be stored in the PC 39 and loaded into the controller as needed or the controller program may be stored in RAM on the controller card. The motor 18 provides encoder signals to the controller, and the controller includes interfaces for the encoder signals that detect signal errors. For example, the interface may look for a missing signal. Encoder signals generally comprise pairs of up and down pulses. If one pulse is missing, the interface sets an alarm. If a duty cycle of the pulses falls outside an expected range, an alarm may also be set. The controller further includes a set of software counters which increment or decrement according to the incoming encoder signals. Regardless of whether or not power is being provided to the motor 18, the counters continue to maintain a total representing the position of a motor shaft of the motor 18, thereby avoiding errors in motor shaft position due to outside influences that might force the motor shaft out of an intended position. A power supply in the PC 39 provides power to drive the motor 18 in both directions with a signal voltage output from 0 volts to approximately +−10 Volts. This power signal is passed to an amplifier to provide motor power in proportion to the signal voltage.

The robotic controller receives instructions from a computer program to rotate the motor shaft in the form of total encoder counts to define the size of the rotation and encoder counts per second to define angular velocity. Angular acceleration and angular deceleration are similarly defined. When the robotic controller executes a rotation, it first calculates a trajectory based on the angular speed and duration of the move. Then it begins to apply a power level to the motor 18 which rotates the motor shaft in the desired direction. The angular position of the motor shaft is monitored by observing the encoder counts several thousand times a second. The angular position of the motor shaft is compared with the theoretical trajectory and the error is converted to a power change to the motor 18, in the direction that will correct the error.

The robotic controller has the ability to turn off or on a number of signal outputs at points in time or according to pre-defined conditions, thereby controlling the actuators 212, 218. A complicated string of instructions to rotate the motor shaft, stop the motor shaft, operate an actuator 212 or 218 and rotate the motor shaft again are assembled to achieve the desired motions of the workpiece 38.

Figure 2:
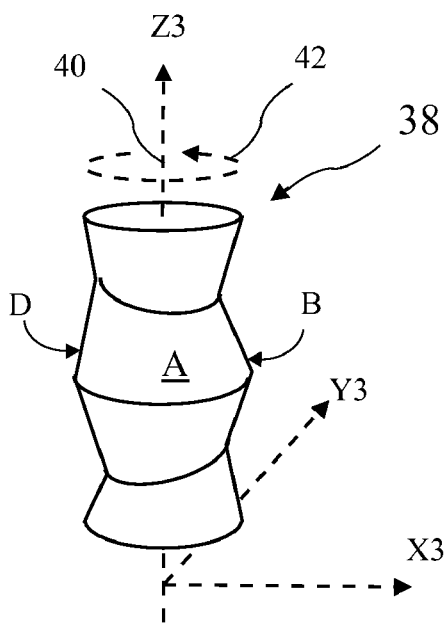
FIG. 2 depicts a workpiece suitable for use with the present invention.
Figure 2B:
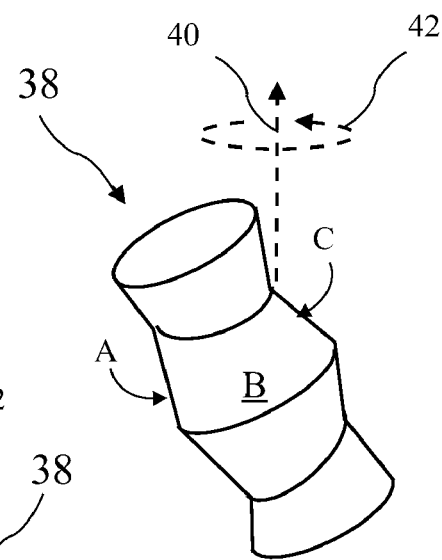
FIG. 2B depicts the workpiece tilted with a face "A" tilted down and rotated 90 degrees clockwise from FIG. 2A.
Figure 2A:
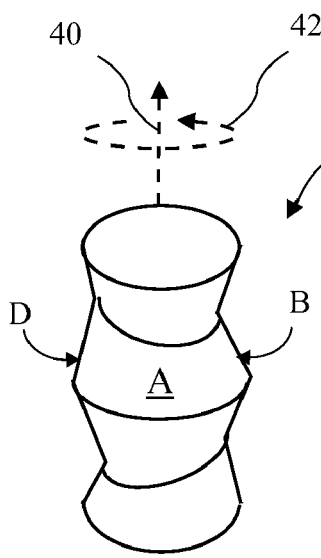
FIG. 2A depicts the workpiece tilted with a face "A" tilted down.
Figure 2C:
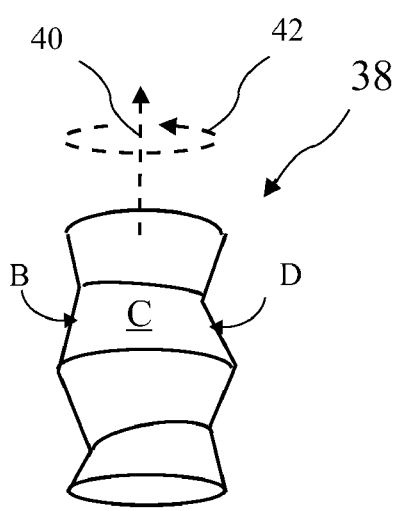
FIG. 2C depicts the workpiece tilted with a face "A" tilted down and rotated 180 degrees clockwise from FIG. 2A.
Figure 2D:
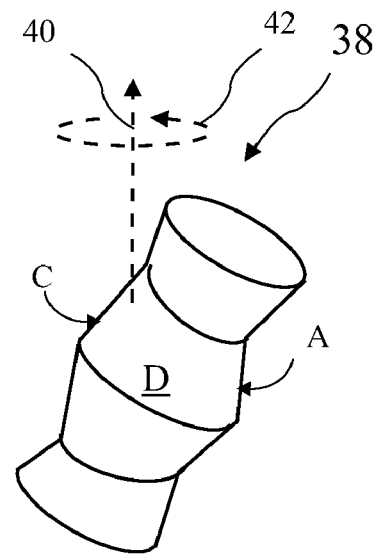
FIG. 2D depicts the workpiece tilted with a face "A" tilted down and rotated 270 degrees clockwise from FIG. 2A.
Figure 3A:
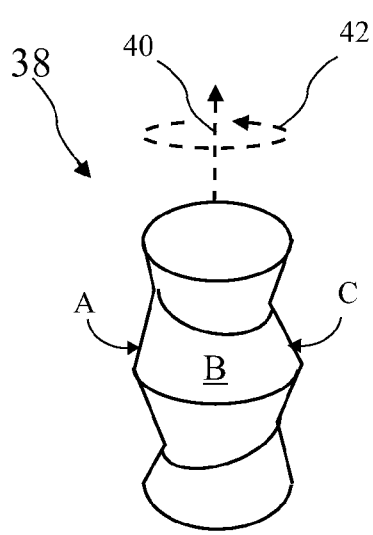
FIG. 3A shows the workpiece tilted with a face "B" tilted down.
Figure 3B:
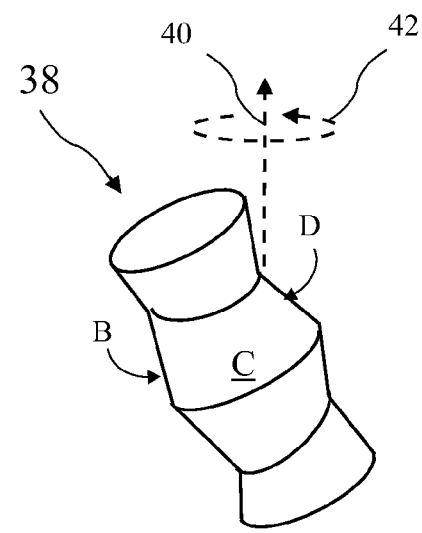
FIG. 3B depicts the workpiece tilted with a face "B" tilted down and rotated 90 degrees clockwise from FIG. 3A.
Figure 3C:
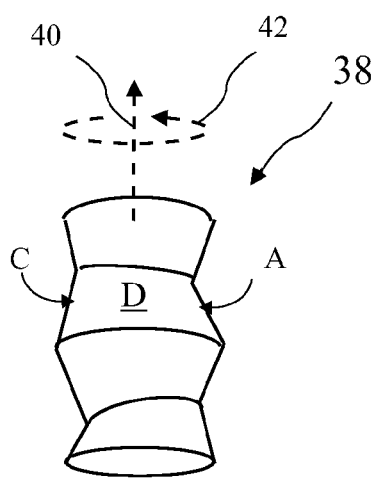
FIG. 3C depicts the workpiece tilted with a face "B" tilted down and rotated 180 degrees clockwise from FIG. 3A.
Figure 3D:
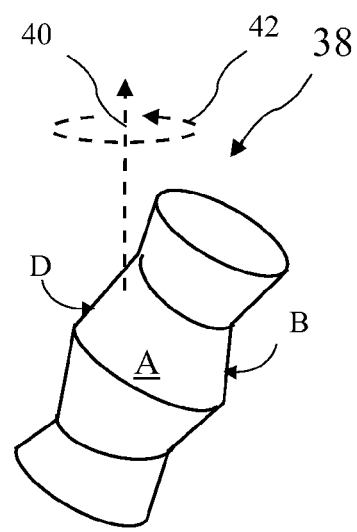
FIG. 3D depicts the workpiece tilted with a face "B" tilted down and rotated 270 degrees clockwise from FIG. 3A.

A workpiece 38 suitable for use with the robotic turntable 200 is shown residing vertically in FIG. 2. The workpiece 38 includes faces A, B, C (on a back side), and D. The workpiece 38 may be fixed to the workpiece table 206 and is aligned with a third coordinate system (X3, Y3, Z3) of the workpiece table 206. The coordinate systems are described in detail in FIGS. 4-10. The present invention allows the workpiece 38 to be rotated for scanning, welding (for example, laser welding) or for any other process benefitting from the positioning provided by the present invention. The workpiece 38 may be rotated while in the vertical position about the axis of rotation 40 as indicated by vertical workpiece rotation 42. The axis of rotation 40 does not tilt (e.g., vertical in this example) with respect to the first sine table 202.

In many instances, a simple single axis rotation as depicted in FIG. 2 is not adequate to provide sufficient views of the workpiece 38. This inadequacy may be addressed by tilting and rotating the workpiece 38 as depicted in FIGS. 2A, 2B, 2C, and 2D. The workpiece 38 is shown tilted with a face "A" tilted down in FIG. 2A. The workpiece 38 is rotated about the axis of rotation 40 and in each position shown in FIGS. 2A-2D, the face A remains down.

The workpiece 38 is depicted in FIGS. 3A, 3B, 3C, and 3D tilted and rotated with the face "B" tilted down. The workpiece 38 may further be tilted with faces C and/or D down, and rotated about the axis of rotation 40. Note that the axis of rotation 40 remains fixed (e.g., vertical in this example), regardless of the tilt of the workpiece 38.

Figure 4:
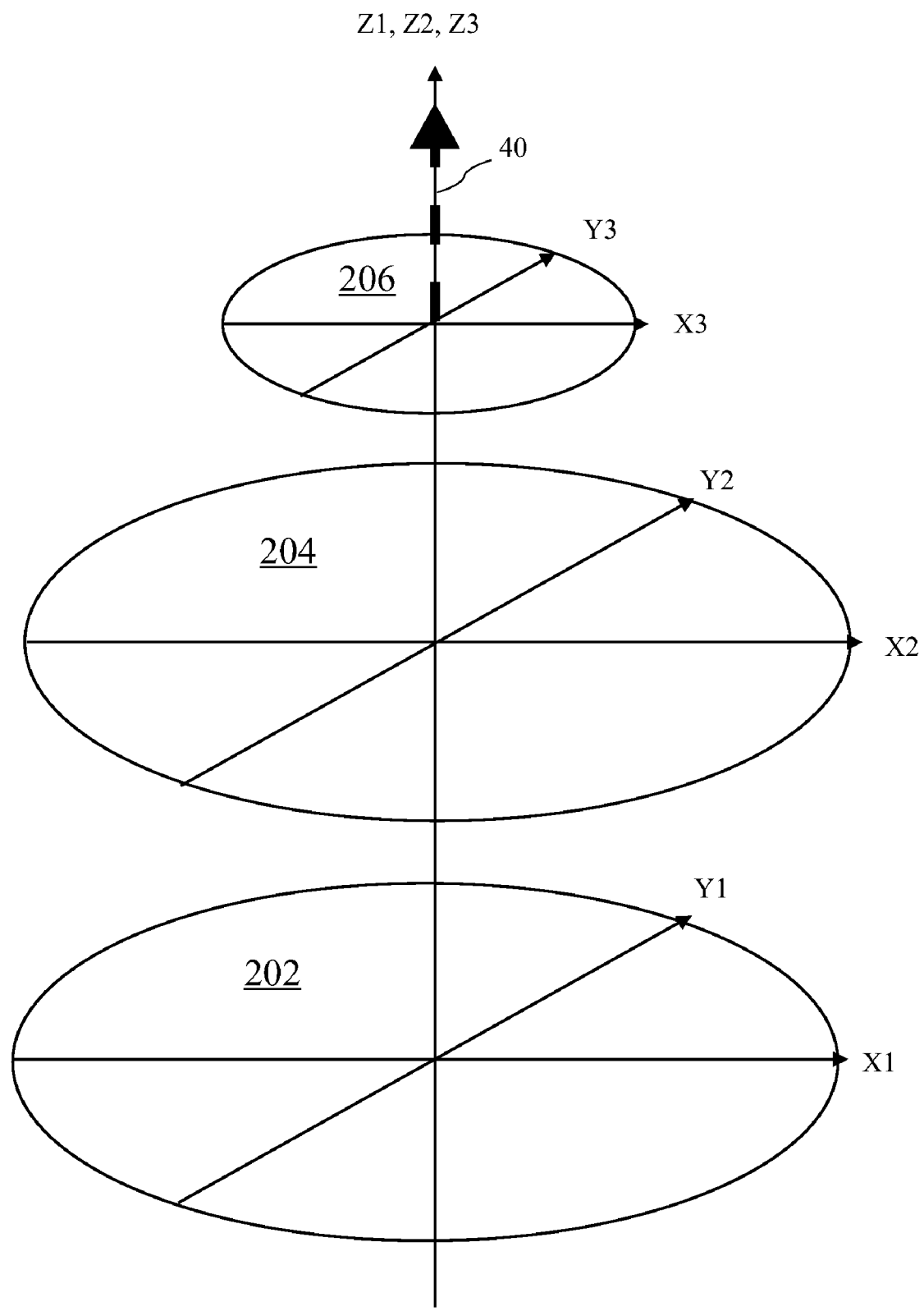
FIG. 4 shows the geometric alignment of a first sine table, second sine table, and workpiece table before rotations or tilts.

The alignment of the first sine table 202, the second sine table 204, and the workpiece table 206 before any rotations or tilts is shown in FIG. 4. The first sine table 202 is geometrically described by coordinate system X1, Y1, Z1. The second sine table 204 is geometrically described by the coordinate system X2, Y2, and Z2. The workpiece table 206 is geometrically described by the coordinate system X3, Y3, and Z3. The axis of rotation 40 is aligned with the Z1 axis and remains aligned with the Z1 axis.

Figure 5:
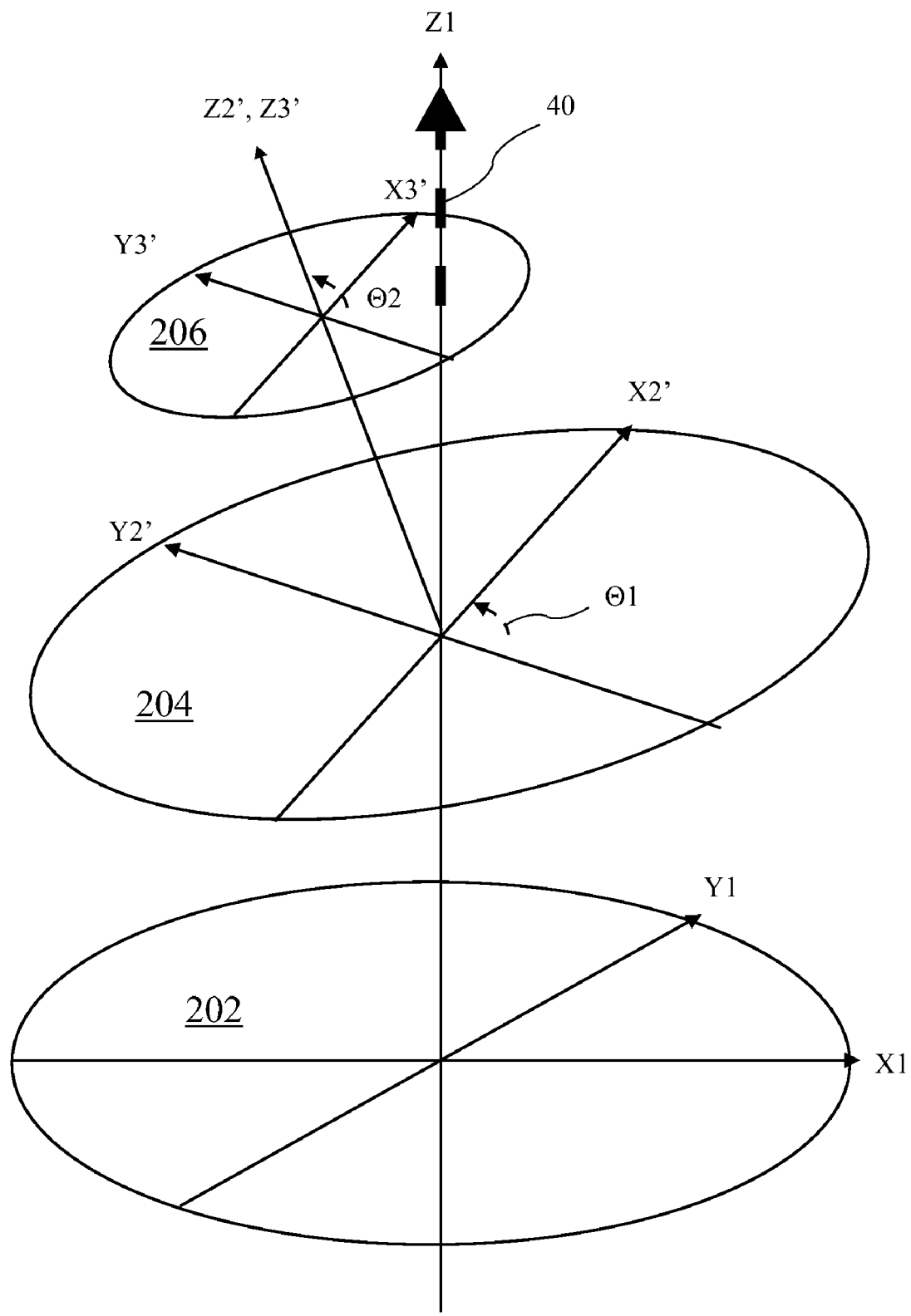
FIG. 5 shows the geometric alignment of the first sine table, the second sine table, and the workpiece table after rotating the second sine table with respect to the first sine table.

The alignment of the first sine table 202, the second sine table 204, and the workpiece table 206, after rotating the second sine table 204 with respect to the first sine table 202 by an angle Θ1, is shown in FIG. 5. The second sine table 204 is geometrically described by the axes X2', Y2' and Z2', and the workpiece table 206 is geometrically described by the axes X3', Y3', and Z3'. The workpiece table 206 remains rotationally fixed to the second sine table 204 while the second sine table 204 is rotated with respect to the first sine table 202.

Figure 6:
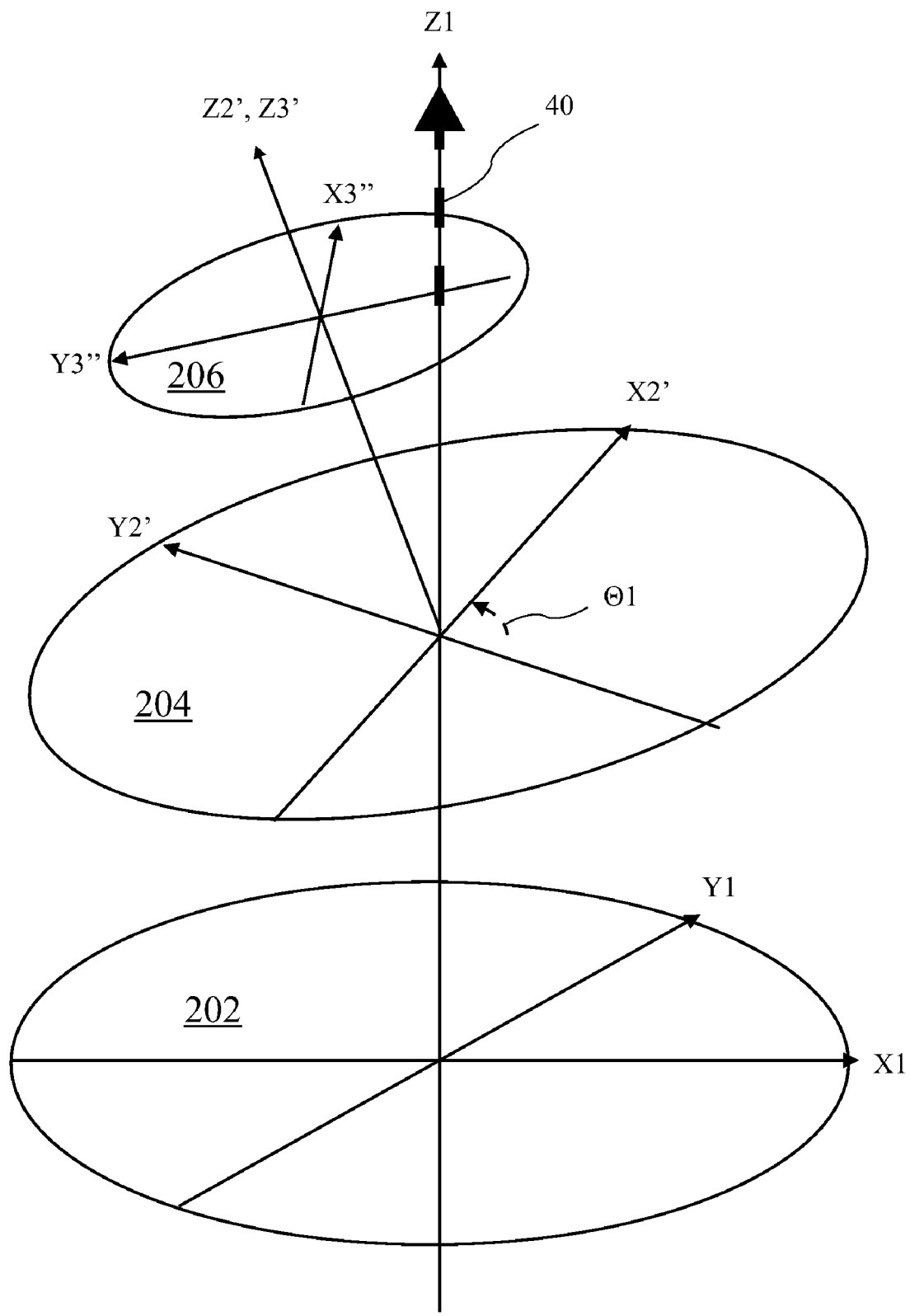
FIG. 6 shows the geometric alignment of the first sine table, the second sine table, and the workpiece table after rotating the second sine table with respect to the first sine table and tilting the workpiece table with respect to the first sine table and the second sine table.

The alignment of the first sine table 202, the second sine table 204, and the workpiece table 206 after rotating the second sine table 204 by the angle Θ1 with respect to the first sine table 202 (as seen in FIG. 5), and after rotating the workpiece table 206 by an angle Θ2 about the parallel Z2' and Z3' axes, with respect to the second sine table 204 is shown in FIG. 6. The axis of rotation 40 remains fixed and aligned with the original Z1 axis, but the face of a workpiece, mounted to the workpiece table 206, which is leaned downward have been changed.

Figure 7:
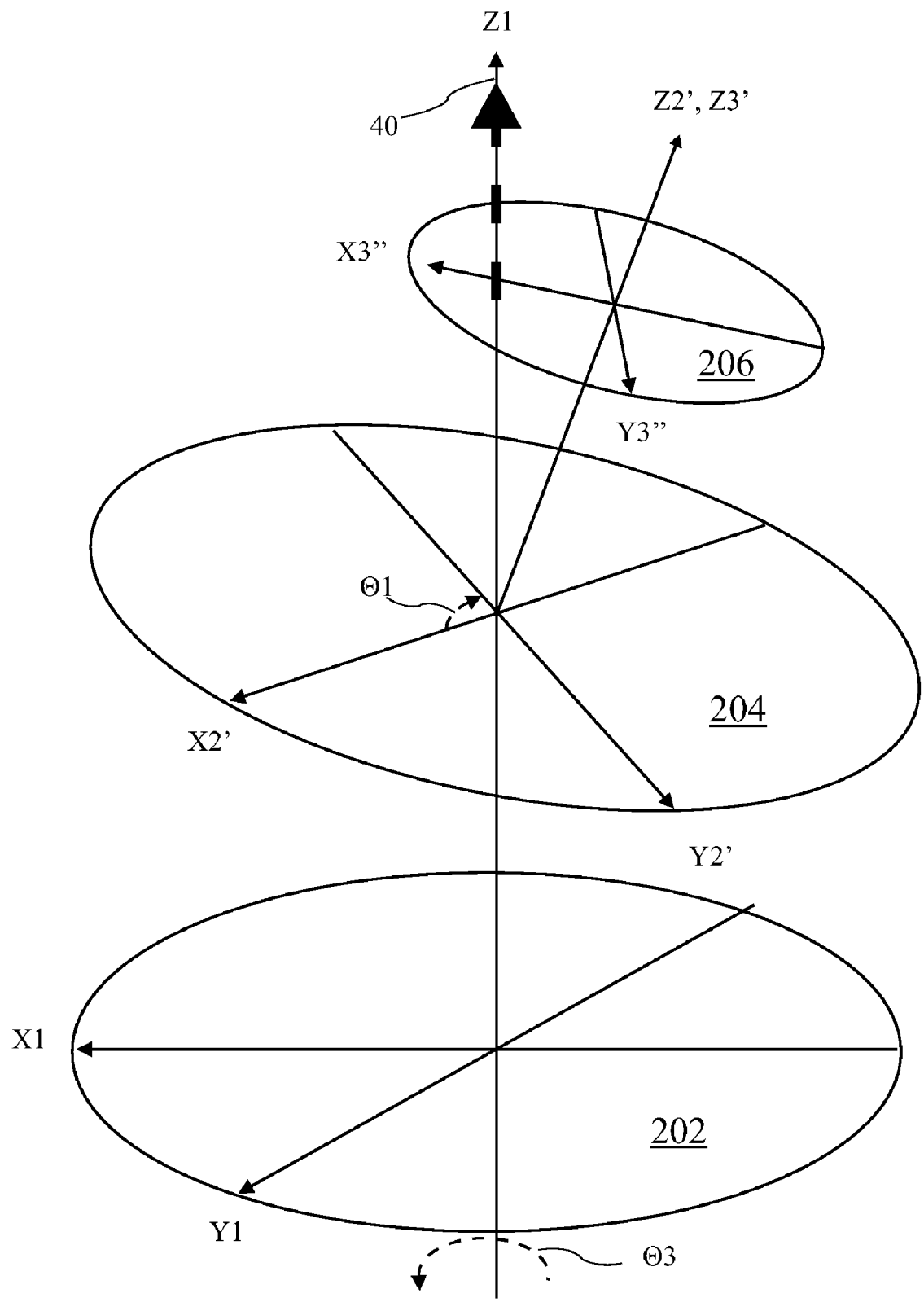
FIG. 7 shows the geometric alignment of the first sine table, the second sine table, and the workpiece table after rotating the second sine table with respect to the first sine table and tilting the workpiece table with respect to the first sine table and the second sine table and rotating the first sine table.

The geometries depicted in FIG. 6 are shown after an additional rotation of Θ3 of the rotating table assembly 201 (see FIG. 1A) in FIG. 7. The relative rotation of the second sine table 204 with respect to the first sine table 202 is unchanged, and the tilt of the workpiece table 206 with respect to the second sine table 204 is unchanged. For example, the change from FIG. 6 to FIG. 7 is representative of the basic rotation of the rotating table assembly 201 while the workpiece 38 is being scanned or welded. The same face of the workpiece 38 (i.e., the face aligned with the Y3" axis) is leaning downward in both FIGS. 6 and 7. The rotation Θ3 is thus representative of rotations occurring during scanning or welding a workpiece.

Figure 8A:
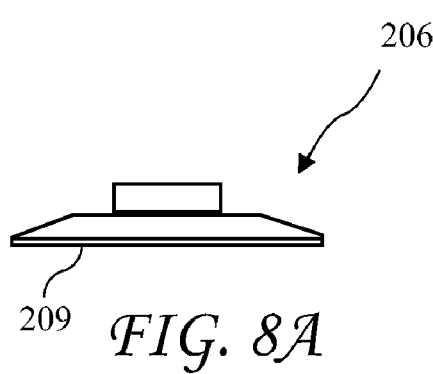
FIG. 8A is a side view of a workpiece table according to the present invention.
Figure 8B:
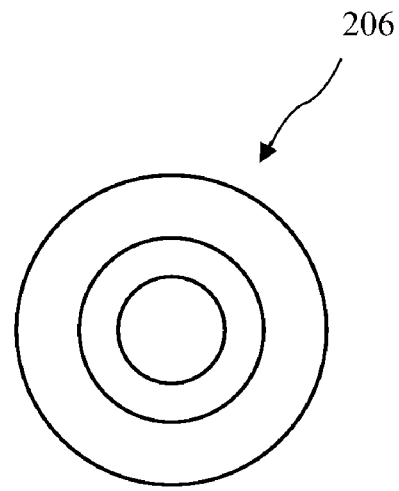
FIG. 8B is a top view of the workpiece table according to the present invention.
Figure 9A:
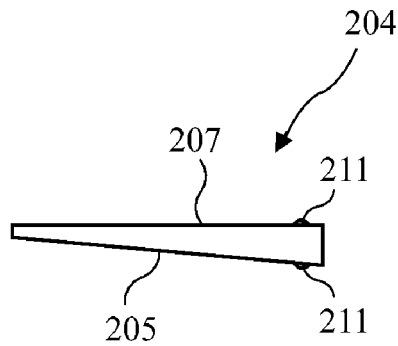
FIG. 9A is a side view of a second sine table according to the present invention.
Figure 9B:
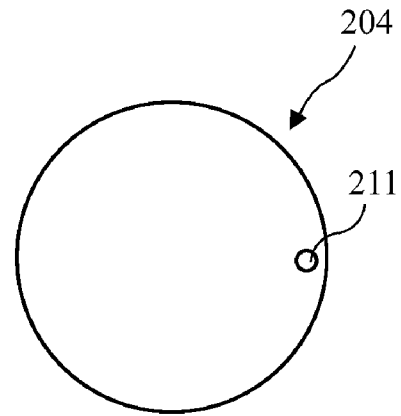
FIG. 9B is a top view of the second sine table according to the present invention.
Figure 10A:
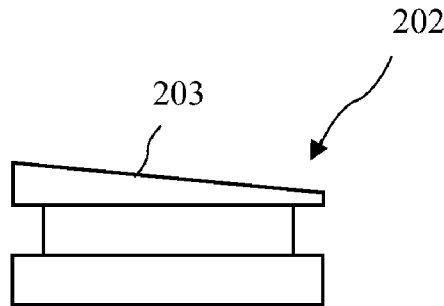
FIG. 10A is a side view of a first sine table according to the present invention.
Figure 10B:
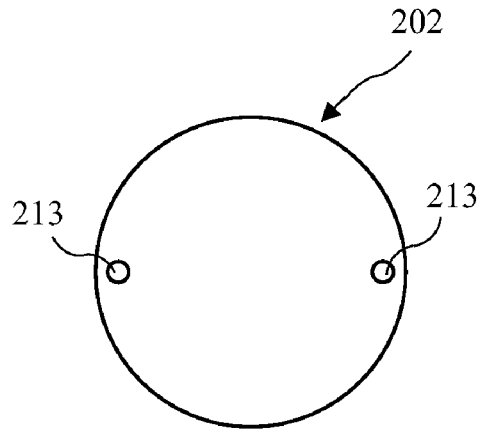
FIG. 10B is a top view of the second sine table according to the present invention.

A side view of the workpiece table 206 according to the present invention is shown in FIG. 8A, a top view of the workpiece table 206 is shown in FIG. 8B, a side view of a second sine table 204 according to the present invention is shown in FIG. 9A, a top view of the second sine table 204 is shown in FIG. 9B, a side view of a first sine table 202 according to the present invention is shown in FIG. 10A, and a top view of the second sine table 202 is shown in FIG. 10B. The first workpiece table 204 and a titled top surface 203 and the second sine table 204 has a tilted bottom surface 205. The titled top surface 203 and the tilted bottom surface 205 cooperate to provide a sine table function to tilt the top surface 207 of the second sine table and thereby tilt the workpiece table 206.

Indexing is provided by upward and downward facing detents 211 residing in the second sine plate 204. The detents preferably comprise balls 211 with a spring between the balls 211 biasing the balls outward. The top surface 203 of the first sine table 202 includes indentations 213 spaced 180 degrees apart. The ball 211 on the bottom of the second sine table enter the indentations 213 to position the second sine plate with respect to the first sine plate.

Additional indentations 213 reside on the bottom surface of the workpiece plate 206 index the angular position of the workpiece table with respect second sine table. Preferably the bottom surface of the workpiece table 206 includes at least four indentations providing at least four rotational positions. In some applications more than four indentation may be advantageous.

A side view of the robotic turntable 200 with the first actuator arm 212 aligned with a first lever 210 to rotate the first sine table 202 while holding the second sine table 204 and the workpiece table 206 to change the tilt of the second sine table 204 and the workpiece table 206 with respect to the first sine table 202 is shown in FIG. 11A and a top view of the robotic turntable 200 with the first actuator arm 212 aligned with the first lever 210 to change the tilt of the second sine table 204 and the workpiece table 206 with respect to the first sine table 202 is shown in FIG. 11B. A side view of the robotic turntable 200 after tilting the second sine table 204 and the workpiece table 206 through arc A with respect to the first sine table 202 is shown in FIG. 12A and a top view of the robotic turntable 200 after tilting the second sine table 204 and the workpiece table 206 with respect to the first sine table 202 is shown in FIG. 12B. Both the motor 18 and the actuator arm 212 are controlled by the computer system 39 to achieve the desired tilt of the workpiece table 206.

Figure 13A:
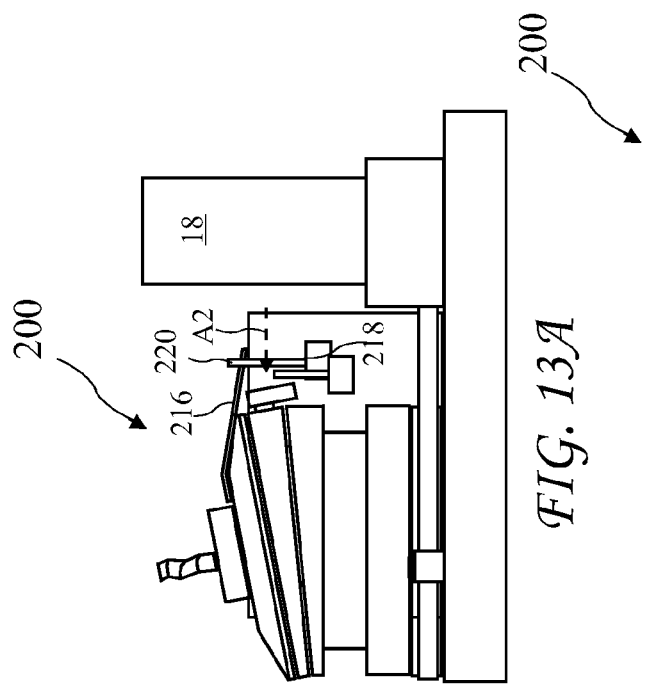
FIG. 13A is a side view of the robotic turntable with a second actuator arm aligned with a second lever to rotate the first sine table and second sine table while holding the workpiece table to rotate the workpiece table with respect to the first sine table and the second sine table.
Figure 13B:
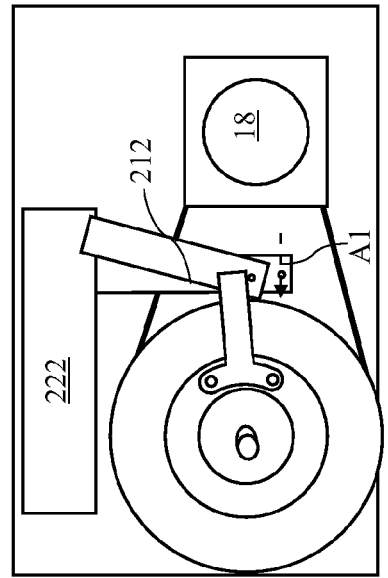
FIG. 13B is a top view of the robotic turntable with the second actuator arm aligned with the second lever to rotate the first sine table and second sine table while holding the workpiece table to rotate the workpiece table with respect to the first sine table and the second sine table.
Figure 14A:
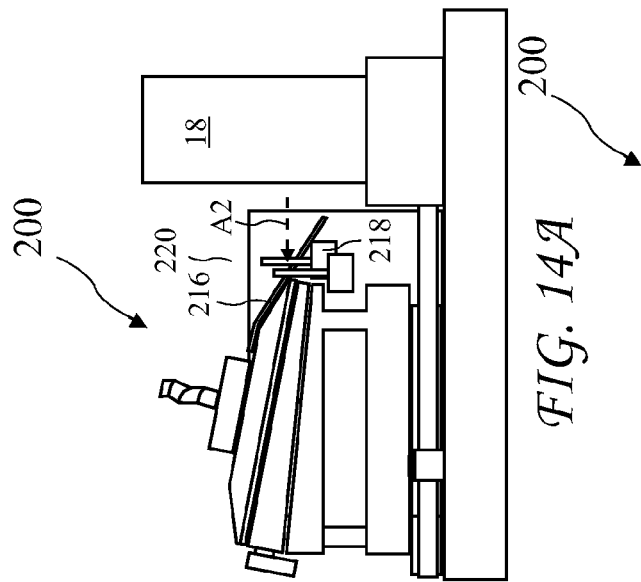
FIG. 14A is a side view of the robotic turntable with the workpiece table rotated with respect to the first sine table and the second sine table.
Figure 14B:
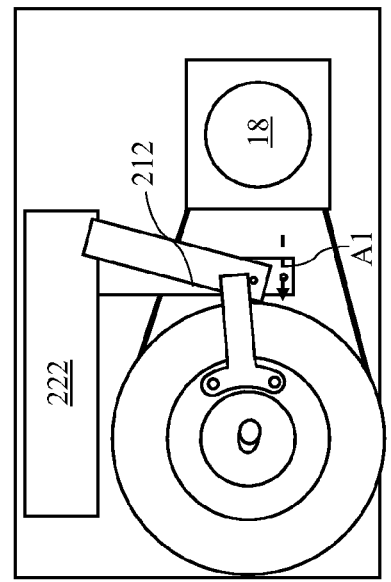
FIG. 14B is a top view of the robotic turntable with the workpiece table rotated with respect to the first sine table and the second sine table.
Figure 15:
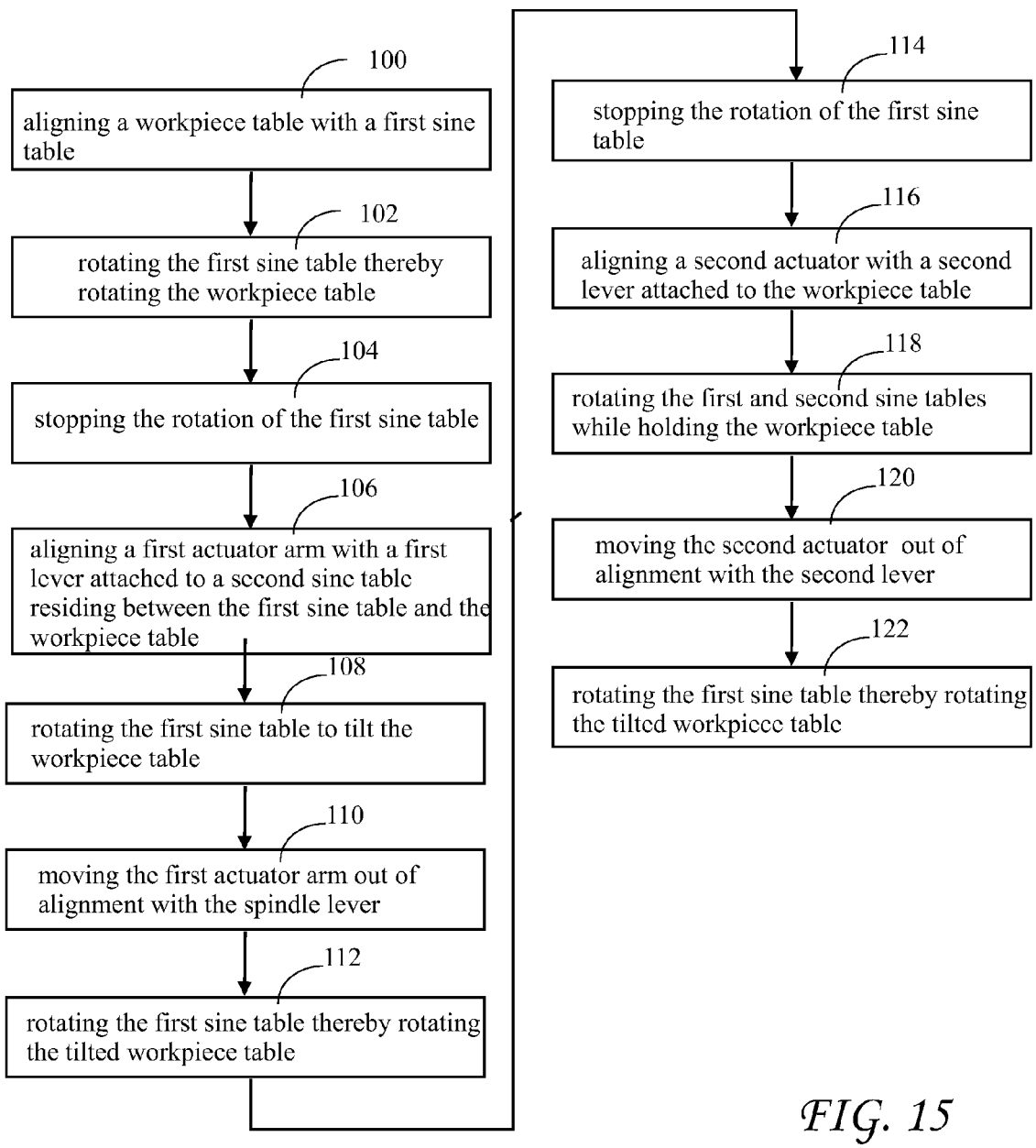
FIG. 15 describes a method according to the present invention.

A side view of the robotic turntable 200 with the second actuator arm 218 aligned with a second lever 216 to rotate the first sine table 202 and second sine table 204 while holding the workpiece table 206 to rotate the workpiece table 206 with respect to the first sine table 202 and the second sine table 204 is shown in FIG. 13A and a top view of the robotic turntable 200 with the second actuator arm 218 aligned with a second lever 216 to rotate the workpiece table 206 with respect to the first sine table 202 and the second sine table 204 is shown in FIG. 13A. A side view of the robotic turntable 20 with the workpiece table 206 rotated with respect to the first sine table 202 and the second sine table 204 is shown in FIG. 14A and a top view of the robotic turntable 20 with the workpiece table 206 rotated with respect to the first sine table 202 and the second sine table 204 is shown in FIG. 14B. Both the motor 18 and the actuator arm 218 are controlled by the computer system 39 to achieve the desired rotation of the workpiece table 206. The second vertical finger 220 has sufficient vertical extent to engage the lever 216 regardless of the tilt of the workpiece table 206.

A method according to the present invention for rotating a workpiece is described in FIG. 20. The method includes aligning a workpiece table with a first sine table at step 100 and rotating the first sine table thereby rotating the workpiece table at step 102. After scanning the vertically aligned workpiece, the rotation of the first sine table is stopped at step 104, aligning a first actuator arm with a first lever attached to a second sine table residing between the first sine table and the workpiece table at step 106. The rotating the first sine table to tilt the workpiece table at step 108, thereby causing a spindle attached to the workpiece table to tilt and the workpiece table to tilt. After moving the first actuator arm out of alignment with the spindle lever at step 110, the first sine table is again rotated thereby rotating the tilted workpiece table to obtain a scan of the tilted workpiece at step 112. The method may further include stopping the rotation of the first sine table at step 114 and aligning a second actuator with an second lever at step 116. The rotating the first and second sine tables while holding the workpiece table at step 118 to create a new rotational relationship between the first sine table and the tilted workpiece table. Moving the second actuator out of alignment with the second lever at step 120 and the first sine table again rotated at step 122 thereby rotating the tilted workpiece table with a different view of the workpiece for scanning or for welding the workpiece.

The robotic turntable is described above having two actuators 212 and 218. Other embodiments may include a single actuator having two degrees of freedom of motion, or, for example, a single actuator which turns to selectively engage the levers 210 and 214.

While the invention herein disclosed has been described by means of specific embodiments and applications thereof, numerous modifications and variations could be made thereto by those skilled in the art without departing from the scope of the invention set forth in the claims.

I claim:

1. A robotic turntable comprising:
   a motor;
   a first table rotationally driven by the motor;
   a workpiece table mechanically coupled to the first table wherein the workpiece table is rotatable with the first table to maintain a rotational position of the workpiece table with respect to the first table and the workpiece table is rotatable with respect to the first table to change the rotational position of the workpiece table with respect to the first table and the workpiece table is tiltable to a first tilt and to a second tilt with respect to the first table;
   a first actuator moveable between a free position and a stop position, wherein while the first actuator is in the free position the first actuator does not affect rotation of the workpiece table thereby allowing the workpiece table to rotate with the first table, and while the first actuator is in the stop position the first actuator prevents the workpiece table from rotating with respect to the first table thereby changing the tilt of the workpiece table with respect to the first table; and
   a second actuator moveable between a second free position and a second stop position, wherein while the second actuator is in the second free position a second actuator does not contact rotatable elements of the robotic turntable, and while the second actuator is in the second stop position, the rotation of the first table is coupled to a change in rotational position of the workpiece table.

2. The robotic turntable of claim 1, wherein the first table is a first sine table, and further including a second sine table residing between the first sine table and the workpiece table and having a flat sloping bottom surface and rotatably cooperating with a flat sloping top surface of the first sine table, wherein
   the second sine table is rotationally positionable relative to the first sine table;
   if the first actuator is in the free position, the second sine table rotates with the first sine table;
   if the first actuator is in the stop position, the rotation of the first sine table is coupled to a change in the tilt of the second sine table and the workpiece table with the first sine table; and
   if the second actuator is in the stop position, the rotation of the first sine table is coupled to a change in rotational relationship of the work piece table with respect to the second sine table.

3. The robotic turntable of claim 2, wherein the workpiece table is constrained to have the same tilt as the second sine table.

4. A robotic turntable comprising:
a motor;
a first sine table having a flat sloping top surface and rotated by the motor;
a second sine table having a flat sloping bottom surface mechanically connected on the sloping top surface of the first sine table;
a workpiece table mechanically connected to a top surface of the second sine table; and
wherein:
a first actuator is moveable to a stop position wherein the first actuator cooperates with the second sine table to prevent the rotation of the second rotating table when the first sine table is rotated to change the rotational position of the second sine table with respect to the first sine table thereby changing a tilt of the second sine table;
a second actuator moveable to a second stop position wherein the second actuator cooperates with a lever attached to the workpiece table and combined with rotation of the first sine table rotated the workpiece table with respect to the first and second sine tables; and
changes to rotation and tilt are obtained solely by the positions of the first and second actuators and rotation of the first sine table by the motor.

5. A method for controlling a workpiece table, the method comprising:
aligning a vertical axis of a workpiece table at a first tilt with respect to a first sine table, the workpiece table rotatably coupled to the first sine table, the first sine table rotationally carried by a base;
rotating the first sine table using a servo motor attached to the base thereby also rotating the workpiece table at the first tilt;
stopping the rotation of the first sine table;
aligning a second non-rotating actuator arm attached to the base with a tilt lever, the tilt lever mechanically coupled to the first sine table and rotating with the first sine table and having a first position causing the workpiece table to assume the first tilt and a second position causing the workpiece table to assume a second tilt with respect to the first sine table;
rotating the first sine table to cause the second actuator arm to engage the tilt lever to pivot the tilt lever from the first position to the second position, thereby causing the workpiece table to move from the first tilt angle to the second tilt angle;
moving the second actuator arm out of alignment with the tilt lever; and
rotating the first sine table thereby rotating the tilted workpiece table at the second tilt angle.

6. The method of claim 5, further including:
stopping the rotation of the first sine table;
aligning a first non-rotating actuator arm attached to the base with an actuator notch in a non-tilting second sine table, the second sine table rotatably coupled to the first sine table and the workpiece table non-rotatably coupled to the second sine table and tiltable at the first tilt and at the second tilt with respect to the second sine table;
rotating the first sine table to cause the first actuator arm to engage the actuator notch in the second sine table to hold the second sine table rotationally fixed while the first sine table rotates to create a new rotational relationship between the first sine table and the workpiece table;
moving the first actuator arm out of alignment with the actuator notch; and
rotating the first sine table thereby rotating the tilted workpiece table at a new rotational alignment between the first sine table and the workpiece table.

* * * * *